Jan. 30, 1968 R. L. CAHN 3,366,199
INDIVIDUAL SERVICE TRAY CARRIER DELIVERY AND RETURN SYSTEM
Filed Jan. 3, 1967 3 Sheets-Sheet 1
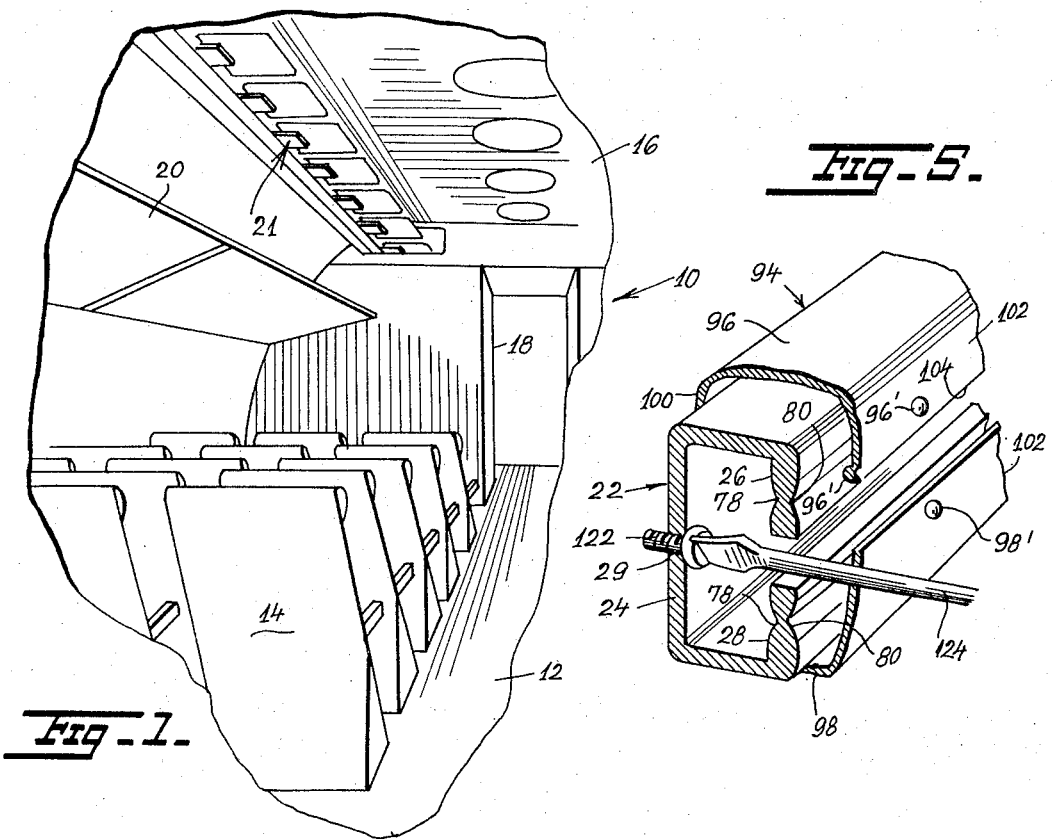
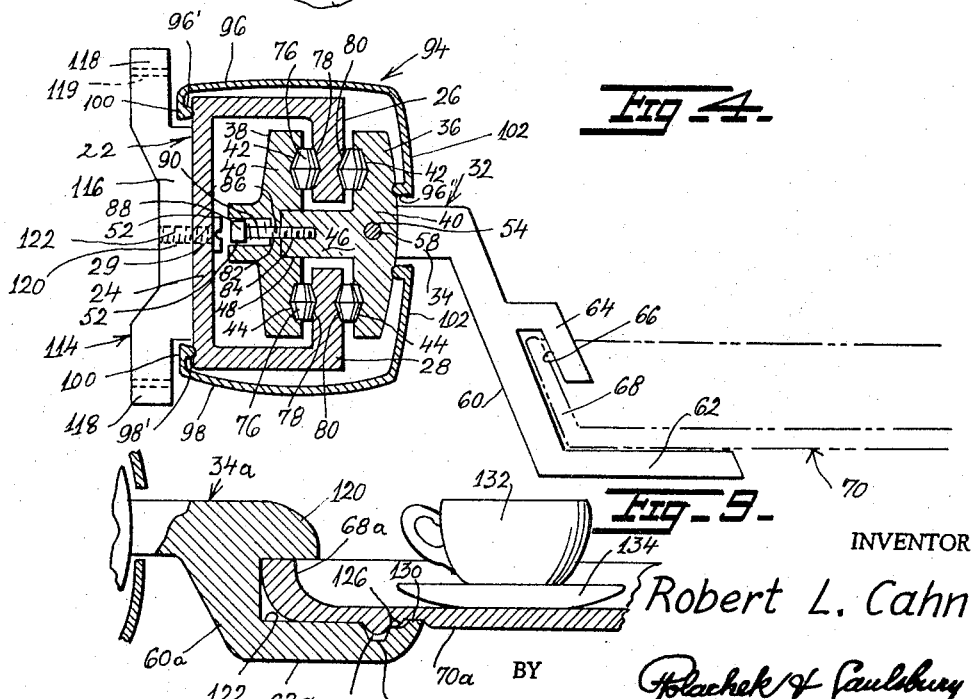
INVENTOR
Robert L. Cahn
BY Polachek & Saulsbury
ATTORNEYS

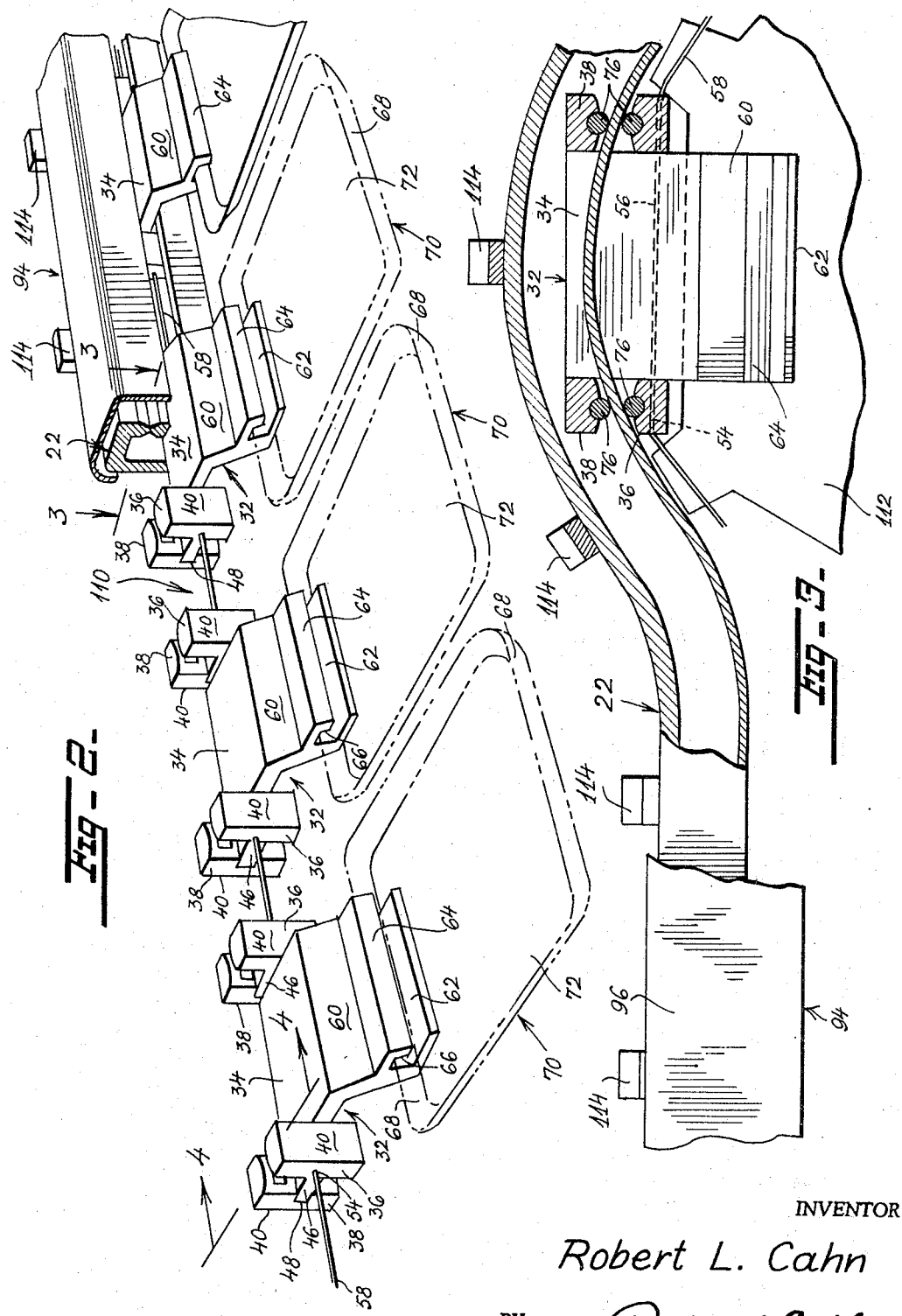

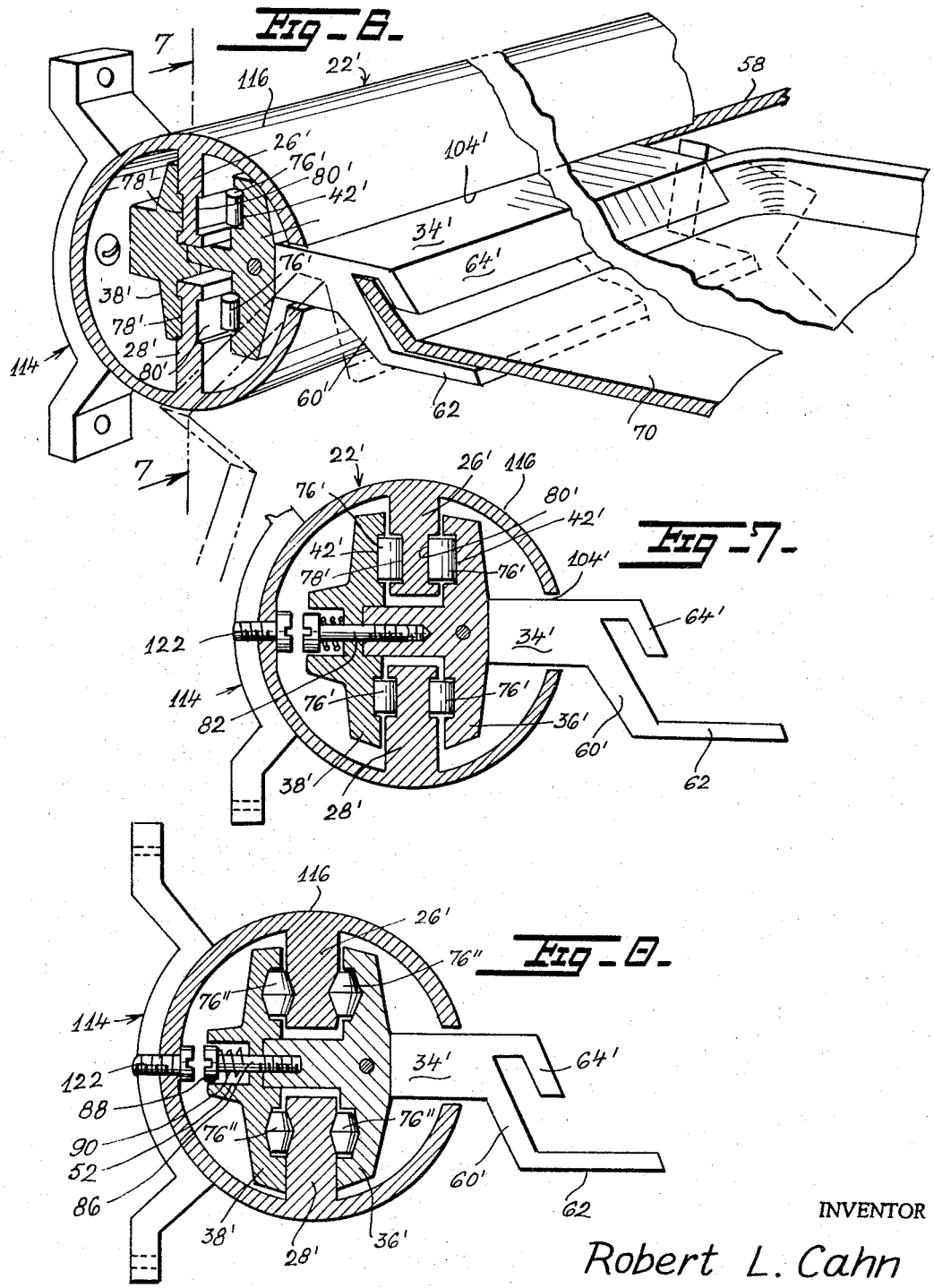

United States Patent Office 3,366,199
Patented Jan. 30, 1968

3,366,199
INDIVIDUAL SERVICE TRAY CARRIER DELIVERY
AND RETURN SYSTEM
Robert L. Cahn, 1 Manetto Court,
Huntington, N.Y. 11743
Continuation-in-part of application Ser. No. 513,801,
Dec. 14, 1965. This application Jan. 3, 1967, Ser.
No. 606,697
10 Claims. (Cl. 186—1)

ABSTRACT OF THE DISCLOSURE

A tray carrier delivery and return system having a series of individual trays conveyed along a path by tray carriers while held in horizontal cantilever fitted position. The tray supports are so constructed that the trays may be readily removed while in a horizontal position. After removal, the trays can be readily refitted for return travel. The conveyor chassis, trackway and tray carriers are provided with removable snap-on dust covers.

This invention relates to improvements in individual service tray carrier delivery and return system which is particularly adapted for use in aircraft. This application is a continuation-in-part of my co-pending application, Ser. No. 513,801, filed Dec. 14, 1966, now Patent No. 3,295,635.

Basically, the invention includes a series of individual trays conveyed along a path by tray carriers or supports while held in horizontal cantilever fitted position. The trays are rigidly retained and moved in a horizontal plane so that their contents cannot fall off. The tray supports are so constructed that service personnel can easily remove each tray while it remains in a horizontal position. Trays can easily and readily be refitted and engaged in the tray supports for return travel. When the apparatus is not in use, all trays can be removed. The apparatus then presents a neat, inconspicious, unobtrusive appearance.

A primary object of the present invention is to provide a tray delivery system beyond the system disclosed in my above copending application wherein the conveyor chassis, trackway and tray carriers are provided with removable snap-on dust covers.

Another object of the invention is to provide a tray delivery system wherein the tray carriers are mounted on the trackway on vertically spaced pairs of roller bearings.

Another object of the invention is to provide a tray delivery system wherein the roller bearings for the tray carriers travel on extruded metal or plastic trackway with snap-on dust covers.

Still another object of the invention is to provide a tray delivery system wherein the chassis for the trackway is readily mounted and demounted on a vertical supporting surface in an appropriate location for use, as above the seats in an aircraft or other common carrier.

Further object of the invention is to provide a tray delivery system with spaced pillow blocks for the roller bearings and biasing means to permit the rollers to accommodate themselves about curves of the pillows or trackways.

A still further object of the invention according to a modification of the invention is to provide a tray delivery system wherein the trackway is formed integrally and continuously with an extruded metal or plastic tubular housing.

A still further object of the invention according to a modification is to provide a tray delivery system with means on the tray support for interlocking with the base of a supported tray to hold the tray in place under its cantilevered weight.

For a better understanding of the invention, reference may be had to the following detailed description taken in connection with the accompanying drawing, in which:

FIGURE 1 is a perspective view of a fragment of an aircraft cabin looking forward, with a service tray delivery system of the present invention installed therein.

FIG. 2 is an enlarged fragmentary perspective view of a portion of the service tray delivery system of FIG. 1, separated from the cabin interior.

FIG. 3 is a cross-sectional and plan view taken generally on line 3—3 of FIG. 2 shown mounted on a sprocket wheel, parts being shown broken away.

FIG. 4 is a vertical cross-sectional view taken generally on line 4—4 of FIG. 2 showing a supporting bracket attached thereto.

FIG. 5 is a fragmentary sectional and perspective view of a portion of a chassis and trackway with a tool in position preparatory to the fastening of the chassis to a vertical bracket support.

FIG. 6 is an enlarged fragmentary sectional and perspective view of a portion of a service tray delivery system embodying a modified form of the invention, wherein the trackway is formed integrally with the tubular cover housing.

FIG. 7 is a vertical sectional view taken on line 7—7 of FIG. 6.

FIG. 8 is a view similar to FIG. 7 showing a modified form of roller bearing unit.

FIG. 9 is a sectional view of a modified form of tray carrier showing a modified form of tray supported thereon, and with a cup and saucer shown on the tray.

Referring in detail to the various views of the drawings, in FIG. 1 is a fragment of an aircraft cabin 10 and is shown having a floor 12, seats 14 thereon, a ceiling 16 thereabove and an entrance doorway 18. The service tray delivery system is installed close to the ceiling 16, above the usual luggage racks 20 and out of the way, as indicated generally at 21.

My improved conveyor service tray delivery system 21 includes an elongated continuous closed wall mounted trackway 22 consisting of a channel-shaped chassis 24 with integral vertically opposed spaced rails 26 and 28 and running up one side of the chain and down the other. At spaced intervals along the trackway, the chassis has holes 29. This trackway 22 is formed of precision extruded aluminum or plastic material.

At spaced intervals along the trackway 22, tray carrier assemblies 32 are slidably mounted on the opposed rails 26 and 28. Each tray carrier assembly 32 includes a rectangular shaped plate 34 horizontally-disposed as viewed in FIG. 2. At each end of the plate, at one long side thereof, a pair of upstanding vertically-disposed pillow blocks 36 and 38 is mounted. The pillows have plate-like lateral extension 46 extending outwardly mid-downwardly from plate 34 with opposed upper and lower raceways 42 and 44, respectively, in the inner faces thereof. The pillow block 36 has formed on its inner face a plate-like lateral extension 46 extending outwardly midway its ends, and the pillow block 38 has formed on its inner face a central corresponding grooved socket 48 adapted to receive the free end of the plate extension 46. Pillow block 38 is also formed with a plate-like extension 50 on its outer face, which extension is formed with a central socket 52. The body portions 40, 40 of the pillow block 36 are provided with transverse passages 54 and the plate portion 34 are formed with longitudinal passages 56 that register with the passages 54 to provide clearance for a conveyor cable 58 passing therethrough.

At the other long side of the rectangular-shaped plate 34, of each assembly 32, the plate 34 slants downwardly forming an integral extension 60 and at its bottom end continues angularly on the same plane as the body of the plate forming a horizontally disposed shelf 62 as viewed in FIGS. 2 and 4. Adjacent the bottom end of the slanting extension 60, a hooked-shaped angular extension 64 is formed, and with the slanting extension 60 define a socketed recess 66 opening downwardly to receive the top end of the flange 68 of a conventional tray 70, the base 72 of the tray resting on the shelf 62 and its flange 68 resting against the slanting extension 60 as seen in FIG. 4. The tray 70 is readily mounted in supported horizontal position by inserting its flange 68 underneath the hooked portion 64 of the plate 34 and the tray 70 allowed to rest on the shelf 62.

In assembling the tray carrier assemblies 32 and the trackway 22, the pillow blocks 38 are placed inside the rails 26 and 28 and the pillow blocks 36 on the outside thereof. These pillow blocks move along the rails on roller bearings 76, with cylindrical bodies that taper outwardly from the ends toward the center, mounted in the grooves 42, 44, in the inner faces of the pillow blocks and in grooves 78 and 80 formed in the inner and outer faces, respectively, of the rails 26 and 28, these grooves forming upper and lower raceways as viewed in FIG. 4. The pillow blocks 36 and 38 are adapted to be adjustably and yieldingly fastened to each other by means of threaded bolts 82 threaded at one end into threaded recesses 84 in the extensions 46 on the pillow blocks 36, the smooth portions of the shanks of the bolts extending through passages 86 in the bodies of the pillow blocks 38 with the heads 88 of the bolts 82 disposed in the recesses 52 in the extensions 50 of pillow blocks 38, with compression springs 90 sleeved around the smooth portions of the shanks of the bolts 82 and seated on the bases of the recesses 52 and impinging against the heads of the bolts thus yieldingly connecting the pillow blocks 36 and 38 together. The bolts 82 serve as load spring interference compensators to adjust the pressure of the pillow blocks upon the roller bearings 76.

According to the invention, the exposed trackway 22 is protected by an elongated dust cover 94 composed of upper and lower sections 96 and 98, respectively, as best seen in FIG. 4. The body of each section is slightly bulged with a narrow flange 100 along the rear edge as viewed in FIG. 4 and with a wide flange 102 along the front edge thereof. The wide flanges 102 cover the front faces of the rails 26 and 28, leaving a space 104 between the opposed edges thereof to provide a clearance for the plate-like bodies 34 of the tray carrier assemblies 32 to extend outwardly therethrough. The cover sections may be snapped in position on the trackway, inwardly extending bosses 96' and 97' being provided therefor.

The trackway 22 may be readily supported on a vertical support such as a wall by means of elongated wall brackets 114 having flat plate like bodies 116 with offset ends 118 provided with holes 119 for attachment to a side wall or other supporting surface. The flat bodies 116 are provided with central threaded holes 120 adapted to receive the ends of screws 122 extending through the holes 29 in the trackways 22. In FIG. 5, a tool in the form of a screw driver 124 is shown projected through the space 104 between the long edges of the dust cover 94, the pillow blocks 36 and 38 being removed, preparatory to driving the screw 122 into the bracket 114.

The spaced tray carriers 32 and cable 58 are adapted to form an endless flexible conveyor chain 110 as shown in FIG. 2 and pass over a sprocket wheel 112 driven by a motor such as shown in my above-mentioned pending application, which can be supported from the ceiling of the aircraft at front and rear locations thereof. When the motor is energized, the chain 110 of tray carriers 32 is driven continuously at slow speed. A control switch (not shown) is provided for starting and stopping the movement of the chain. The path of movement of the chain is so disposed that the trays may be readily removed by service personnel. The hooked portions 64 prevent the trays from slipping horizontally off of the carriers.

In the modification of the invention shown in FIGS. 6 and 7, a chassis 22' comprises a slotted tubular member 116 formed with a slot 104' along one side thereof. This tubular member 116 is extended from aluminum or plastic formed with integral opposed upper and lower rails 26' and 28' respectively, each rail having grooves 78' and 80' which with the grooves 42' and 44' on the pillow blocks 36' and 38' form the raceways for the bearing members which in this form are conventional roller bearings 76'. Furthermore, in this form of the invention, the hooked portion 64' of plate 34' is formed at the juncture of the plate 34' and the slanting extension 60' instead of adjacent the bottom of the slanting extension.

In all other respects, the modification of the invention of FIGS. 6 and 7 is the same as the invention shown in FIGS. 1 to 4, inclusive, and similar reference numerals are used to indicate similar parts.

It will be understood that the bearing members 76' instead of being conventional cylindrical roller bearings may taper from the ends to the centers as embodied in the bearing members 76" shown in FIG. 8.

In FIG. 9, a modified form of tray carrier plate assembly is illustrated. In this form of plate, the downwardly slanting extension 60a terminates in a laterally extending horizontally disposed shelf 62a. The plate is formed with an overhanging ridge 120 which with the shelf 62a defines a channel 122 which receives the flange 68a of the tray 70a. This tray 70a is shown formed with an outer depending ridge 124 at its underside and an adjacent groove 126. The ridge will engage in a groove 128 of shelf 62a while groove 126 will receive an upwardly extending lip 130 formed at the free end of shelf 62a. By this arrangement, the trays cannot slip horizontally off the tray carriers, and each tray is adapted to support a cup 132 and saucer 134 in a truly horizontally balanced position.

While I have illustrated and described the preferred embodiments of my invention, it is to be understood that I do not limit myself to the precise construction here disclosed and that various changes and modifications may be made within the scope of the invention as defined in the appended claims.

What I claim is:

1. A tray delivery and return conveyor system comprising an elongated trackway having upper and lower rails vertically spaced apart from each other, said rails having grooves in the outer and inner faces thereof, tray carriers slidably mounted on the rails in spaced apart relation, each carrier including a rectangular-shaped plate extending through the space between the rails, a pair of spaced opposed pillow blocks at each end of the plate, said pillow blocks having elongated rectangular upright bodies in opposed relation, the ends of the bodies overlapping the rails, said bodies having grooves in the faces thereof, the grooves in the rails and the grooves in the bodies of the pillow blocks defining raceways, roller bearings in said raceways, a downwardly slanting extension on the long forward edge of the plate, a laterally-extending shelf on the bottom end of said extension, an integral angular hooked portion extending laterally of the slanting extension above the shelf, said hooked portion and shelf defining a channel for receiving the flanged rim of a tray for supporting the tray in a horizontal position, the carrier plates and bodies of the pillow blocks having aligned horizontally disposed passages therethrough and a cable extending through said latter passages for operatively connecting the tray carriers together for moving said tray carriers along the rails.

2. A tray delivery and return conveyor system as defined in claim 1 wherein the elongated trackway is channel-shaped and dust cover sections snapped over the trackway and over the outer pillow blocks, said cover sections being spaced apart to provide a clearance for the extending plates of the tray carriers.

3. A tray delivery and return conveyor system as defined in claim 2 wherein the elongated trackway is provided with spaced holes therealong and means provided for attaching the trackway to a vertical supporting surface, said attaching means including spaced brackets to which the trackway is fastened, said brackets having elongated rectangular bodies with central holes therein and screws extending through the holes in the trackway and the holes in the bodies of the brackets, the ends of the bracket bodies having holes for receiving fastening elements for fastening the brackets to the supporting surface.

4. A tray delivery and return conveyor system as defined in claim 3 wherein the holes in the trackway and the space between the rails are in alignment for receiving a tool for driving the screws.

5. A tray delivery and return conveyor system as defined in claim 1 wherein one pillow block of each pair of pillow blocks has an extension at its center extending laterally thereof, said extension having a central threaded socket, the other pillow block of the pair having a central socket on its inner face to receive the end of said extension, the outer face of said other pillow block having a central recess opposing the central recess in its inner face, said other pillow block having a passage connecting the recesses in the outer and inner faces thereof, a headed screw extending through the passage in said other pillow block with its threaded end in the central threaded socket in the extension of said one pillow, and a compression spring on the smooth shank portion of said screw, one end of the spring seated on the base of the recess in the outer face of said other pillow block, the other end of said spring impinging against the head of said screw whereby the pillow blocks are yieldingly connected to each other.

6. A tray delivery and return conveyor system as defined in claim 1 wherein the roller bearings comprise elongated substantially cylindrical bodies tapering from the ends to the centers thereof.

7. A tray delivery and return conveyor system as defined in claim 3 wherein the holes in the trackway, the space between the rails and the space between the cover sections are in alignment for receiving a tool for driving the screws and wherein the roller bearings comprise elongated cylindrical bodies tapering from the ends to the centers thereof.

8. A tray delivery and return conveyor system as defined in claim 1 wherein the trackway is tubular in shape with a slot extending therealong at one side thereof receiving the tray carrier plate and said rails being integrally formed within the tubular formation.

9. A tray delivery and return conveyor system as defined in claim 8 wherein the hooked portion of the carrier plates extension is formed at the juncture of the plate and said extension and wherein the bodies of the roller bearings are tapering from their ends to the centers thereof.

10. A tray delivery and return conveyor system as defined in claim 1 wherein the shelf on the extension of the carrier plate is formed with a groove in the upper face thereof and with a lip at the free end thereof, said groove adapted to receive a ridge on a tray and said lip adapted to be received in a groove in said tray.

References Cited

UNITED STATES PATENTS

| | | | |
|---|---|---|---|
| 2,915,169 | 12/1959 | Abbey | 198—177 |
| 3,102,607 | 9/1963 | Roberts | 186—1 |
| 3,202,259 | 8/1965 | Orwin | 198—177 |

EVON C. BLUNK, *Primary Examiner.*

H. C. HORNSBY, *Assistant Examiner.*